United States Patent [19]

Ramos

[11] Patent Number: 4,467,171

[45] Date of Patent: Aug. 21, 1984

[54] LASER CUTTING NOZZLE

[75] Inventor: Terry J. Ramos, Brentwood, Calif.

[73] Assignee: The United States of America as represented by the United States Department of Energy, Washington, D.C.

[21] Appl. No.: 429,921

[22] Filed: Sep. 30, 1982

[51] Int. Cl.³ .............................................. B23K 27/00
[52] U.S. Cl. ........................ 219/121 LG; 219/121 FS
[58] Field of Search ................ 219/121 LG, 121 LN, 219/121 FS, 121 LC, 121 LD, 121 LH, 121 LJ

[56] References Cited

U.S. PATENT DOCUMENTS

| | | | |
|---|---|---|---|
| 3,107,266 | 10/1963 | Hine | 250/42 |
| 3,524,046 | 8/1970 | Brouwer | 219/121 LK |
| 3,569,660 | 3/1971 | Houldcroft | 219/121 LH |
| 3,594,261 | 7/1971 | Broerman | 219/121 L |
| 3,685,882 | 8/1972 | van der Jagt | 219/121 FS X |
| 4,127,761 | 11/1978 | Pauley et al. | 219/121 FS |
| 4,201,905 | 5/1980 | Clark et al. | 219/121 L |

FOREIGN PATENT DOCUMENTS 131546 10/1979 Japan ............................. 219/121 FS

OTHER PUBLICATIONS

Raytheon Products Brochure SS-500 Series.

Primary Examiner—C. L. Albritton
Attorney, Agent, or Firm—Henry P. Sartorio; L. E. Carnahan; Michael F. Esposito

[57] ABSTRACT

A laser cutting nozzle for use with a laser cutting apparatus directing a focused beam to a spot on a work piece. The nozzle has a cylindrical body with a conical tip which together have a conically shaped hollow interior with the apex at a small aperture through the tip. The conical hollow interior is shaped to match the profile of the laser beam, at full beamwidth, which passes through the nozzle to the work piece. A plurality of gas inlet holes extend through the body to the hollow interior and are oriented to produce a swirling flow of gas coaxially through the nozzle and out the aperture, aligned with the laser beam, to the work piece.

7 Claims, 2 Drawing Figures

LASER CUTTING NOZZLE

BACKGROUND OF THE INVENTION

The United States Government has rights in this invention pursuant to Contract No. W-7405-ENG-48 between the U.S. Department of Energy and the University of California, for the operation of Lawrence Livermore National Laboratory.

The invention relates generally to laser cutting of materials and more particularly to nozzles for laser cutting apparatus.

The laser has complemented or supplanted conventional methods for material processing. Industrial applications of lasers include cutting metals and cloth, drilling holes in a variety of materials, including brittle ceramics, and trimming resistors. Because the output radiation of a laser can be collimated to form a sharply directed beam and focused to a very small spot, of the order of a few wavelengths in diameter, laser beams can be utilized to melt or vaporize small volumes of any known material. Since only the laser beam touches the spot to be melted, precision cuts and small welds or holes can be made. Thus the laser has become a valuable tool in many industries for the fabrication of precision parts.

U.S. Pat. No. 4,201,905 to Clark, et al. issued May 6, 1980 discloses a laser cutting head attachment for punch presses.

U.S. Pat. No. 3,594,261 to Broerman issued July 20, 1971 is directed to a method of manufacturing non-woven fabric by perforating a thermal plastic sheet with a laser beam.

U.S. Pat. No. 3,524,046 to Brouwer issued Aug. 11, 1970 describes method and apparatus for piercing holes in elastomeric articles using a laser.

U.S. Pat. No. 3,107,296 to Hine describes power optical apparatus.

Commercial laser systems have been developed for material processing applications, for example, the Raytheon SS-500 Series Laser Metal Working Systems. A problem with these systems is that the conventional cutting nozzle has a relatively short lifetime. The conventional nozzle generally has a cylindrical bore, with a cone only at the end. Gas flow through the nozzle is then not coaxial but deflected at the sides, and the gas flow from the nozzle is not along the beam axis but off to the sides. The conventional nozzle is thus quickly damaged. Improper gas flow allows deposits of material inside the nozzle caused by a misaligned beam striking the inside walls, which plugs up the aperture. Improper gas flow also does not prevent molten material from the spot on the workpiece where the laser beam is focused from striking the nozzle tip, causing deposits and chipping.

Accordingly, it is an object of the invention to provide a laser cutting nozzle for precision cutting of metals and other materials.

It is another object of the invention to provide a laser cutting nozzle having a long operational lifetime, substantially a year or more.

It is also an object of the invention to provide a laser cutting nozzle having a coaxial gas flow to remove deposits and prevent damage from the work piece.

SUMMARY OF THE INVENTION

The invention is an improved laser cutting nozzle having a conical inner surface shaped to match the laser beam profile and having a plurality of gas inlet holes extending through the inner surface and oriented to produce a coaxial flow of gas through the conical inner volume of the nozzle to the tip.

DETAILED DESCRIPTION OF THE PREFERRED EMBODIMENT

Figure 1:
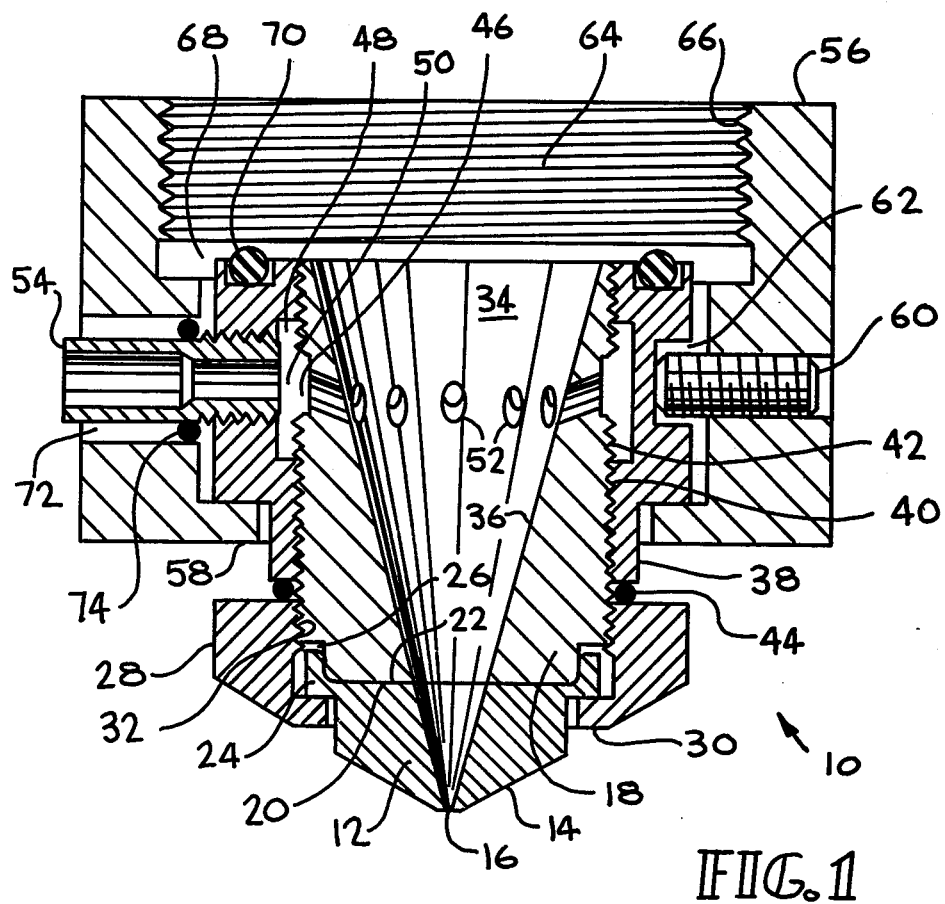
FIG. 1 is a sectional view of the laser nozzle assembly.

The invention is a laser cutting nozzle 10, shown in FIG. 1, for use as the cutting tip of a laser cutting apparatus. In operation the laser cutting nozzle is brought into close proximity to the work piece. The cutting nozzle has a hollow interior through which the laser beam is focused and directed onto the work piece. Gas is flowed through the nozzle to prevent plugging and damage to the nozzle.

The nozzle 10 has a substantially cylindrical shaped cutting tip 12 having a substantially conical outer surface 14 with a small aperture 16 at the apex. The cutting tip 12 is mounted to the end of a substantially cylindrical shaped nozzle body 18. The base 20 of cutting tip 12 contacts end surface 22 of nozzle body 18, and flange 24 of tip 12 fits into groove 26 around the end of nozzle body 18. A retaining ring 28 holds the cutting tip 12 and nozzle body 18 together. Flange 24 of cutting tip 12 sits on flange 30 of retaining ring 28, and nozzle body 18, having a threaded outer surface 42, is securely mounted to threaded surface 32 of retaining ring 28. The retaining ring 28, holding the tip 12, is screwed onto the nozzle body 18 until the tip 12 fits tightly to the body 18. Accordingly, retaining ring 28 holds cutting tip 12 securely to nozzle body 18.

The nozzle body 18 and cutting tip 12 together have a hollow interior 34 defined by inner surface 36. According to the invention the inner surface 36 is substantially conical and shaped to match the laser beam profile which is directed through the hollow interior 34 and focused to a small spot just outside aperture 16 at the apex of cutting tip 12. The size of the cone is determined by the full beam width of the laser so that the converging beam profile just fits inside the cone. The laser beam can, of course, be apertured down if desired.

An alignment ring 38 is securely mounted to the nozzle body 18 by means of threaded inner surface 40 which engages threads on the external surface 42 of body 18. "O" ring 44 forms a tight seal between retaining ring 28 and alignment ring 38. The inner surface 40 of alignment ring 38 has a recess 48 and the exterior surface 42 of nozzle body 18 has a recess 46, which are generally opposed and together define a gas containment channel 50. A plurality of gas inlet holes 52 extend from the channel 50 through the nozzle body 18 into the hollow interior 34. A gas inlet tube 54 extends through the alignment ring 38 to the channel 50.

Figure 2:
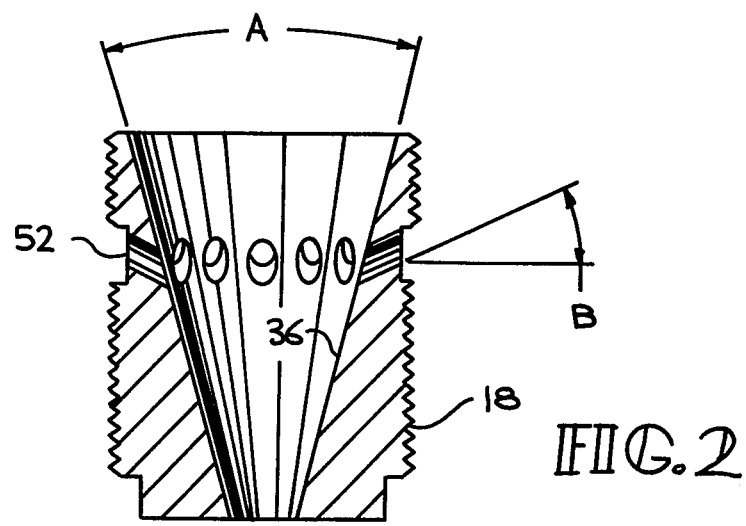
FIG. 2 is a sectional view of the nozzle body showing the preferred orientation of the inner surface and the gas inlet holes.

In a preferred embodiment of the invention, as shown in FIG. 2, the nozzle body 18 has a cone angle A of 30°, and the gas inlet holes 52 are oriented at an angle B of 25° from the horizontal. Typically there are twelve gas inlet holes 52.

In operation gas flows through the inlet tube 54 into the channel 50 surrounding the nozzle body 18 and from the channel 50 into the hollow interior 34 of the nozzle 10. According to the invention the gas inlet holes 52 are oriented to produce a coaxial flow of gas through the hollow interior 34 of nozzle 10; the gas inlet holes 52 are disposed to discharge the gas from the channel 50 downwardly towards the aperture 16 of cutting tip 12. With the gas inlet holes 52 oriented in this manner the problems of gas flow in prior art nozzles are eliminated. By introducing the gas into the conically shaped hollow interior 34 of the nozzle 10, the gas swirls and spirals down, producing a coaxial flow that is directed through the aperture 16 to the work piece directed along the laser beam axis. This gas flow prevents plugging of the tip and damage from materials spattered back from the work piece.

Alignment ring 38 is mounted in adapter ring 56 to complete the assembly of cutting nozzle 10. The alignment ring 38 sits on flange 58 of adapter ring 56. A plurality of set screws 60 mounted in adapter ring 56 engage recesses 62 in alignment ring 38 and are used for lateral stablization of the assembly. The adapter ring 56 has an opening 64 with a threaded inner surface 66 for mounting the nozzle 10 to conventional aparatus producing the laser beam. Alternatively, other fastening means could be utilized for attaching adapter ring 56 to the laser aparatus. A lens assembly 68 at the bottom of opening 64 sits above the alignment ring 38 and an "O" ring 70 forms a seal therebetween. The lens focuses the laser beam which at maximum beamwidth fills the conical interior 34. The gas inlet tube 54 passes through hole 72 in the adapter ring 56 with "O" rings 74 forming a seal.

The cutting tip 12 is typically made of copper (preferably oxygen free), since it is the part most likely to be damaged by beam misalignment or material deposits. Thus, the cutting tip 12 can readily be replaced in the assembly. The remaining parts of the nozzle 10 are typically made of anodized aluminum. However, other metals or materials, including ceramics, can be utilized to fabricate the nozzle 10.

In operation, gas is flowed into the nozzle through inlet tube 54. For heavy cutting, a pressure of 100 psi at the nozzle is utilized. A variety of gases, including Argon, Oxygen and Nitrogen mixture, and Air are utilized. Argon gas protects and cleans the cutting tip 12. Gas containing Oxygen will also support combustion at the work piece.

The nozzle 10 can be used with a variety of lasers, pulsed or CW. As an example, the nozzle is utilized with a Nd:YAG 400W Average Power laser. Precision cutting to better than 0.001 inches can be performed.

Changes and modifications in the specifically described embodiments can be carried out without departing from the scope of the invention which is intended to be limited only by the scope of the appended claims.

I claim:

1. A laser cutting nozzle for attachment to a laser cutting apparatus providing a directed and focused laser beam for cutting a work piece, comprising:
   a substantially cylindrical hollow body;
   a conical hollow tip mounted to the lower end of the body, the tip having a small aperture at its apex;
   a retaining ring holding the body and tip together;
   the hollow body and coincal tip together defining a hollow interior therethrough ending at the aperture in the tip, the laser beam being directed through the hollow interior and aperture in the tip, the laser beam being directed through the hollow interior and aperture to a work piece;
   the hollow interior being shaped substantially conical with its apex at the aperture in the tip, to substantially match the profile of the laser beam at full beamwidth, the angle of the cone being approximately 30°;
   the hollow body further having a plurality of gas inlet holes therethrough oriented to produce a coaxial flow of gas through the hollow interior and through the aperture in the tip;
   an alignment ring to which the body is mounted and defining therebetween a gas containment channel, the gas inlet holes communicating from the containment channel to the hollow interior of the nozzle body;
   inlet means in the alignment ring adapted to flow gas into the containment channel, and through the inlet holes into the hollow interior; and
   an adapter ring to which the alignment ring is mounted, and which is adapted to hold a focusing lens assembly and which is adapted to be attached to the laser cutting apparatus.

2. The cutting nozzle of claim 1 wherein the gas inlet holes are oriented at an angle of 25° from horizontal.

3. The cutting nozzle of claim 1 wherein the tip is made of copper.

4. The cutting nozzle of claim 1 wherein the gas is introduced at a pressure of about 100 psi at the nozzle.

5. The cutting nozzle of claim 2 wherein the gas is introduced at a pressure of about 100 psi at the nozzle.

6. The cutting nozzle of claim 4 wherein the gas is selected from Argon, a mixture of Nitrogen and Oxygen, and Air.

7. The cutting nozzle of claim 5 wherein the gas is selected from Argon, a mixture of Nitrogen and Oxygen, and Air.

* * * * *